United States Patent
Kazda et al.

(10) Patent No.: US 9,827,626 B2
(45) Date of Patent: Nov. 28, 2017

(54) RECIPROCATING SAW BLADE

(71) Applicant: Milwaukee Electric Tool Corporation, Brookfield, WI (US)

(72) Inventors: Austin J. Kazda, Wauwatosa, WI (US); Robert W. Butzen, Colgate, WI (US); Andrew J. Schulz, Slinger, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 14/702,866

(22) Filed: May 4, 2015

(65) Prior Publication Data

US 2015/0231713 A1    Aug. 20, 2015

Related U.S. Application Data

(63) Continuation of application No. 13/213,656, filed on Aug. 19, 2011, now abandoned.
(Continued)

(51) Int. Cl.
*B23D 61/12* (2006.01)

(52) U.S. Cl.
CPC ......... *B23D 61/12* (2013.01); *Y10T 83/9319* (2015.04)

(58) Field of Classification Search
CPC ..... B23D 61/121; B23D 61/123; B23D 61/12
(Continued)

(56) References Cited

U.S. PATENT DOCUMENTS 398,302 A * 2/1889 Wilson .................... 83/850
453,296 A * 6/1891 Tata .................... B26B 9/02
                                        132/75.4
(Continued)

FOREIGN PATENT DOCUMENTS

DE    1026198 B  *  3/1958  ............... B26B 9/02
DE    3706429       9/1988
(Continued)

OTHER PUBLICATIONS

Dewalt, Flush Cut Jig Saw Blade—DW3311, http://dewalt.com/us/products/tool_detail.asp?productID=18394, Oct. 23, 2008, 3.
(Continued)

*Primary Examiner* — Jennifer Swinney
(74) *Attorney, Agent, or Firm* — Michael Best & Friedrich LLP

(57) ABSTRACT

A saw blade for use with a reciprocating saw includes a body and an attachment portion extending from the body. The attachment portion includes a tang and an aperture configured to connect to the reciprocating saw. The saw blade also includes a cutting portion formed on the body. The cutting portion includes a plurality of cutting teeth and a floor guard tooth positioned adjacent at least one of the plurality of cutting teeth. Each cutting tooth has a tip that defines a plane. The floor guard tooth extends from the body beyond the plane. The attachment portion is offset from the plane to reduce interference of the reciprocating saw with a surface while performing a footer cut with the saw blade. The floor guard tooth contacts the surface while performing the footer cut to inhibit the plurality of cutting teeth from contacting the surface.

14 Claims, 5 Drawing Sheets

Related U.S. Application Data

(60) Provisional application No. 61/375,582, filed on Aug. 20, 2010.

(58) Field of Classification Search
USPC .................................................. 125/16.01, 18
See application file for complete search history.

(56) References Cited

U.S. PATENT DOCUMENTS

| | | | |
|---|---|---|---|
| 556,615 A | 3/1892 | Campbell | |
| 542,856 A * | 7/1895 | Johnson | 83/850 |
| 690,678 A | 1/1902 | Thomas | |
| 853,255 A | 5/1907 | Miller | |
| 2,214,827 A | 9/1940 | Boe et al. | |
| 2,256,847 A | 9/1941 | Osenberg | |
| 2,685,131 A | 8/1954 | Seeberger | |
| 3,028,889 A | 4/1962 | McCarty | |
| 3,109,464 A | 11/1963 | La Force | |
| 3,171,457 A | 3/1965 | Brown | |
| 3,262,475 A | 7/1966 | Sweet | |
| 3,651,841 A | 3/1972 | Ohlsson | |
| 3,888,005 A * | 6/1975 | Bagwell | B26B 9/02 30/286 |
| 3,996,664 A * | 12/1976 | Lee | B26B 9/02 30/286 |
| 4,119,004 A | 10/1978 | Ludwig | |
| 4,137,808 A | 2/1979 | Mattes | |
| 4,179,967 A | 12/1979 | Clark | |
| 4,232,578 A | 11/1980 | Stellinger et al. | |
| 4,236,432 A | 12/1980 | Kawakami et al. | |
| 4,292,871 A | 10/1981 | Neumeyer et al. | |
| 4,311,075 A | 1/1982 | Sundstrom | |
| 4,333,371 A | 6/1982 | Matsuda | |
| 4,339,977 A | 7/1982 | Miller | |
| 4,423,553 A | 1/1984 | Miyawaki | |
| 4,423,653 A | 1/1984 | Howard | |
| 4,461,198 A | 7/1984 | Grassmann | |
| 4,492,141 A | 1/1985 | Takeuchi | |
| 4,557,172 A | 12/1985 | Yoneda | |
| 4,640,172 A | 2/1987 | Kullmann et al. | |
| 4,688,458 A | 8/1987 | Krilov | |
| 4,727,788 A | 3/1988 | Yoshida et al. | |
| 4,784,033 A | 11/1988 | Hayden et al. | |
| 4,798,001 A | 1/1989 | Grossmann et al. | |
| 4,813,324 A | 3/1989 | Yoshida et al. | |
| 4,827,822 A | 5/1989 | Yoshida et al. | |
| 4,958,546 A | 9/1990 | Yoshida et al. | |
| 4,969,270 A | 11/1990 | Berghauser et al. | |
| 5,018,421 A | 5/1991 | Lucki et al. | |
| 5,031,324 A | 7/1991 | Berghauser et al. | |
| 5,062,338 A | 11/1991 | Baker | |
| 5,094,135 A | 3/1992 | Nakahara et al. | |
| 5,103,565 A | 4/1992 | Holzer, Jr. | |
| 5,119,708 A * | 6/1992 | Musgrove | B23D 61/123 30/355 |
| 5,193,280 A | 3/1993 | Jackson | |
| 5,231,909 A | 8/1993 | Hsu | |
| 5,331,876 A | 7/1994 | Hayden, Sr. | |
| 5,361,665 A | 11/1994 | Sonefors | |
| 5,410,935 A | 5/1995 | Holston et al. | |
| 5,473,820 A | 12/1995 | Nuebert et al. | |
| 5,477,763 A | 12/1995 | Kullman | |
| 5,501,129 A | 3/1996 | Armstrong et al. | |
| 5,517,889 A | 5/1996 | Logan | |
| 5,524,518 A | 6/1996 | Sundtrom | |
| 5,603,252 A | 2/1997 | Hayden, Sr. | |
| 5,606,900 A * | 3/1997 | Stoddard | 83/846 |
| 5,697,280 A | 12/1997 | Armstrong et al. | |
| 5,832,803 A | 11/1998 | Hayden, Sr. | |
| 5,848,473 A * | 12/1998 | Brandenburg, Jr. | B23D 61/121 30/514 |
| 5,855,157 A | 1/1999 | Okamura et al. | |
| 5,868,058 A | 2/1999 | Senegas | |
| 5,884,547 A | 3/1999 | Carlsen et al. | |
| 5,901,630 A | 5/1999 | Kataoka et al. | |
| 5,918,525 A | 7/1999 | Schramm | |
| 6,003,422 A | 12/1999 | Holston | |
| 6,065,380 A | 5/2000 | Ludh | |
| 6,119,571 A | 9/2000 | Hayden, Sr. | |
| 6,125,544 A * | 10/2000 | Eriksson | A01G 3/08 30/166.3 |
| 6,158,324 A | 12/2000 | Kullmann et al. | |
| 6,167,792 B1 | 1/2001 | Korb et al. | |
| 6,220,139 B1 | 4/2001 | Kobayashi et al. | |
| 6,220,140 B1 | 4/2001 | Hellebergh | |
| 6,244,152 B1 | 6/2001 | Di Nicolantonio | |
| 6,257,226 B1 | 7/2001 | Hayden, Sr. | |
| 6,269,722 B1 | 8/2001 | Hellbergh | |
| 6,276,248 B1 | 8/2001 | Cranna | |
| 6,276,249 B1 | 8/2001 | Handschuh et al. | |
| 6,401,585 B1 | 6/2002 | Morgan | |
| 6,427,573 B1 | 8/2002 | Carlsen et al. | |
| 6,439,094 B1 | 8/2002 | Yoneda et al. | |
| 6,532,852 B1 | 3/2003 | Tsujimoto et al. | |
| 6,543,326 B2 | 4/2003 | Bishop | |
| 6,598,509 B2 | 7/2003 | Cook et al. | |
| 6,601,495 B2 | 8/2003 | Cranna | |
| 6,655,119 B2 | 12/2003 | Hasei et al. | |
| 6,681,674 B2 | 1/2004 | Hakansson et al. | |
| D493,340 S | 7/2004 | Pyatt | |
| 6,782,781 B2 | 8/2004 | Rack | |
| 6,829,973 B1 * | 12/2004 | Yang | 83/835 |
| 6,834,573 B1 | 12/2004 | Nakahara | |
| 6,886,261 B2 | 5/2005 | Haut | |
| 6,988,348 B2 | 1/2006 | Curtsinger et al. | |
| 7,017,465 B2 | 3/2006 | Dion et al. | |
| 7,036,415 B2 | 5/2006 | Tsujimoto | |
| 7,036,417 B2 | 5/2006 | Alton | |
| 7,127,979 B2 | 10/2006 | Kocher et al. | |
| 7,131,365 B2 | 11/2006 | Hall et al. | |
| 7,150,215 B2 | 12/2006 | Krehel | |
| 7,174,823 B2 | 2/2007 | Cranna | |
| 7,178,441 B2 | 2/2007 | Hellbergh | |
| 7,210,388 B2 | 5/2007 | Pacher et al. | |
| 7,225,714 B2 | 6/2007 | Rompel et al. | |
| 7,257,900 B2 | 8/2007 | Wheeler et al. | |
| D551,923 S | 10/2007 | Ammann | |
| D554,452 S | 11/2007 | Ammann | |
| D555,444 S | 11/2007 | Ammann | |
| 7,334,511 B2 | 2/2008 | Hesselberg et al. | |
| 7,451,677 B2 | 11/2008 | Souza et al. | |
| 7,487,704 B2 | 2/2009 | Souza et al. | |
| 7,568,416 B2 | 8/2009 | Tsujimoto | |
| 7,600,458 B2 | 10/2009 | Hampton et al. | |
| 7,640,838 B2 | 1/2010 | Souza et al. | |
| 7,661,347 B2 | 2/2010 | Nagano et al. | |
| 7,661,913 B2 | 2/2010 | Nordlin | |
| 7,806,033 B2 | 10/2010 | Kocher et al. | |
| 2001/0004860 A1 | 6/2001 | Kullman et al. | |
| 2002/0046821 A1 | 4/2002 | Buchanan et al. | |
| 2002/0194975 A1 | 12/2002 | Bishop | |
| 2003/0192419 A1 * | 10/2003 | Conti | B23D 61/126 83/837 |
| 2004/0010278 A1 | 1/2004 | Nakamura et al. | |
| 2004/0050234 A1 | 3/2004 | Fluhrer et al. | |
| 2004/0182218 A1 | 9/2004 | Chao | |
| 2004/0255740 A1 | 12/2004 | Troyer | |
| 2004/0255749 A1 | 12/2004 | Hayden, Sr. | |
| 2005/0132578 A1 * | 6/2005 | Colich | 30/293 |
| 2005/0211023 A1 | 9/2005 | Kalo | |
| 2005/0211046 A1 * | 9/2005 | Thomas et al. | 83/855 |
| 2005/0235799 A1 * | 10/2005 | Hampton | B23D 51/08 83/835 |
| 2005/0262702 A1 * | 12/2005 | Hawthorn | 30/166.3 |
| 2006/0016315 A1 * | 1/2006 | Zorich et al. | 83/835 |
| 2006/0130341 A1 | 6/2006 | Burry et al. | |
| 2006/0130631 A1 | 6/2006 | Hesselberg et al. | |
| 2006/0137498 A1 | 6/2006 | Bowling | |
| 2006/0207398 A1 | 9/2006 | Nicolson et al. | |
| 2007/0039445 A1 * | 2/2007 | Nitsch | 83/835 |
| 2007/0193427 A1 | 8/2007 | Hayden, Sr. | |
| 2007/0199416 A1 | 8/2007 | Cook et al. | |
| 2007/0214922 A1 | 9/2007 | Cook et al. | |

(56) References Cited

U.S. PATENT DOCUMENTS

| | | | |
|---|---|---|---|
| 2007/0251372 A1 | 11/2007 | Petts et al. | |
| 2008/0083122 A1* | 4/2008 | McKenzie | B23D 51/01 30/517 |
| 2008/0121079 A1 | 5/2008 | Hashimoto et al. | |
| 2008/0163735 A1 | 7/2008 | Lundin et al. | |
| 2008/0264231 A1 | 10/2008 | Coe et al. | |
| 2008/0307936 A1 | 12/2008 | Elliston et al. | |
| 2009/0044679 A1 | 2/2009 | Souza et al. | |
| 2009/0049973 A1 | 2/2009 | Huffer et al. | |
| 2009/0145280 A1 | 6/2009 | Bucks et al. | |
| 2009/0293698 A1 | 12/2009 | Tran et al. | |
| 2012/0000338 A1* | 1/2012 | Elliston | B23D 61/121 83/848 |

FOREIGN PATENT DOCUMENTS

| | | | |
|---|---|---|---|
| DE | 10014222 A1 * | 9/2001 | B23D 65/00 |
| GB | 1439515 A * | 6/1976 | B26B 9/00 |
| GB | 2439291 | 12/2007 | |

OTHER PUBLICATIONS

Bosch, Finecut Power Saw, http://www.boschtools.com/Products/Tools/Pages/BoschProductDetail.aspx?pid=1640VS, Available Jun. 14, 2010, 11.

* cited by examiner

RECIPROCATING SAW BLADE

CROSS-REFERENCE TO RELATED APPLICATIONS

This application is a continuation of U.S. patent application Ser. No. 13/213,656, filed Aug. 19, 2011, which claims priority to U.S. Provisional Application No. 61/375,582, filed Aug. 20, 2010, the entire contents of both of which are incorporated by reference herein.

BACKGROUND

The present invention relates to saw blades and, more particularly, to saw blades for use with reciprocating saws.

Saw blades, such as reciprocating saw blades, are used for cutting wood, metal, plastics, and other materials. A saw blade typically includes a body, an attachment portion, and a cutting portion. The cutting portion includes a plurality of teeth made up of one or more tooth forms. When a saw blade is attached to a reciprocating saw, it is often difficult to cut through materials directly adjacent (e.g., on top of) a floor or other hard surface, due to the geometry of the saw blade and the shape and size of the reciprocating saw. In addition, it is often difficult to perform cuts that are flush against another board or surface.

SUMMARY

In one embodiment, the invention provides a saw blade for use with a reciprocating saw. The saw blade includes a body and an attachment portion extending from the body. The attachment portion includes a tang and an aperture configured to connect to the reciprocating saw. The saw blade also includes a cutting portion formed on the body. The cutting portion includes a plurality of cutting teeth and a floor guard tooth positioned adjacent at least one of the plurality of cutting teeth. Each cutting tooth has a tip that defines a plane. The floor guard tooth extends from the body beyond the plane. The attachment portion is offset from the plane to reduce interference of the reciprocating saw with a surface while performing a footer cut with the saw blade. The floor guard tooth contacts the surface while performing the footer cut to inhibit the plurality of cutting teeth from contacting the surface.

In another embodiment, the invention provides a saw blade for use with a reciprocating saw. The saw blade includes a body having a back edge and defining an opening, and an attachment portion extending from the body. The attachment portion includes a tang and an aperture configured to connect to the reciprocating saw. The saw blade also includes a cutting portion formed on the body opposite the back edge. The cutting portion includes a plurality of cutting teeth. Each cutting tooth has a tip that defines a plane. The body has a first height measured generally perpendicularly from the back edge to the plane. The attachment portion has a second height measured generally perpendicular to the plane. A ratio of the first height to the second height is between approximately 4 and approximately 5. The opening facilitates flexing of the body while performing a flush cut with the saw blade.

In yet another embodiment, the invention provides a saw blade for use with a reciprocating saw. The saw blade includes a body having a back edge and defining an opening, and an attachment portion extending from the body. The attachment portion includes a tang and an aperture configured to connect to the reciprocating saw. The saw blade also includes a cutting portion formed on the body opposite the back edge. The cutting portion includes a plurality of cutting teeth, a first floor guard tooth positioned adjacent at least one of the plurality of cutting teeth, and a second floor guard tooth spaced apart from the first floor guard tooth and positioned adjacent at least one of the plurality of cutting teeth. Each cutting tooth has a tip that defines a plane. The first floor guard tooth and the second floor guard tooth extend from the body beyond the plane. The body has a first height measured generally perpendicularly from the back edge to the plane. The attachment portion has a second height measured generally perpendicular to the plane. A ratio of the first height to the second height is between approximately 4 and approximately 5. The opening facilitates flexing of the body while performing a flush cut with the saw blade. The attachment portion is offset from the plane to reduce interference of the reciprocating saw with a surface while performing a footer cut with the saw blade. The first floor guard tooth and the second floor guard tooth contact the surface while performing the footer cut to inhibit the plurality of cutting teeth from contacting the surface.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
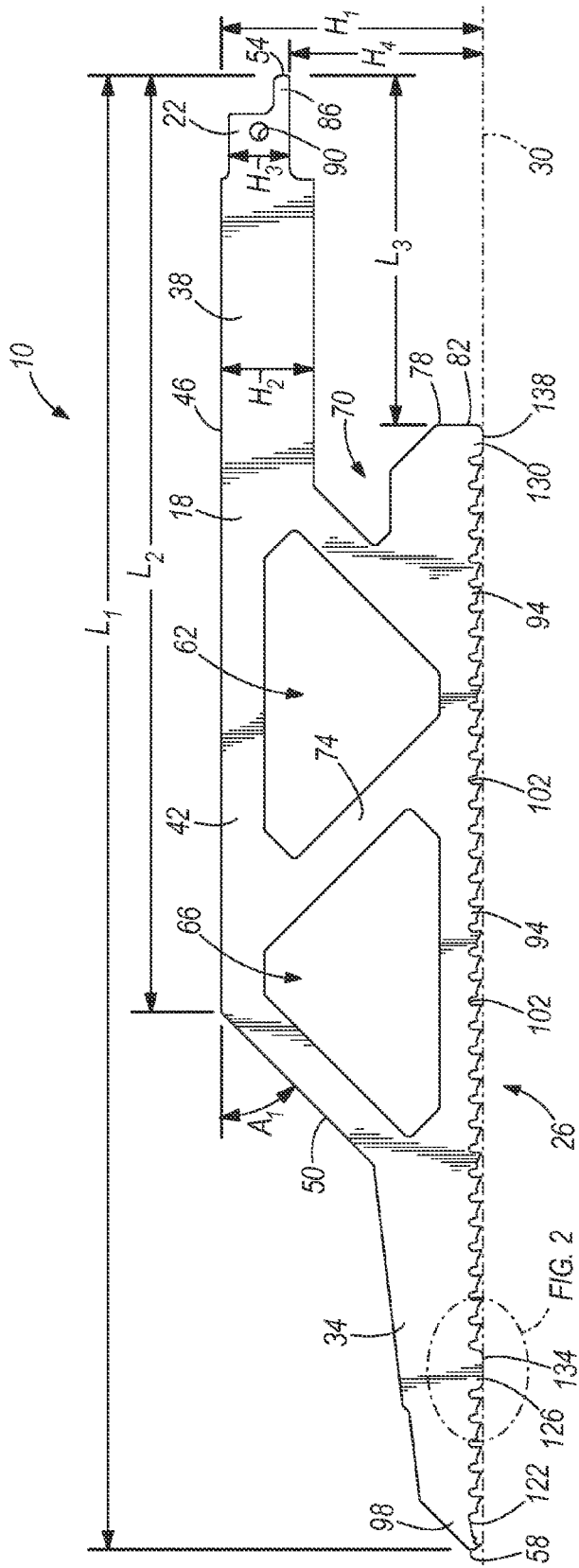
FIG. 1 illustrates a saw blade according to one embodiment of the invention.
Figure 3:
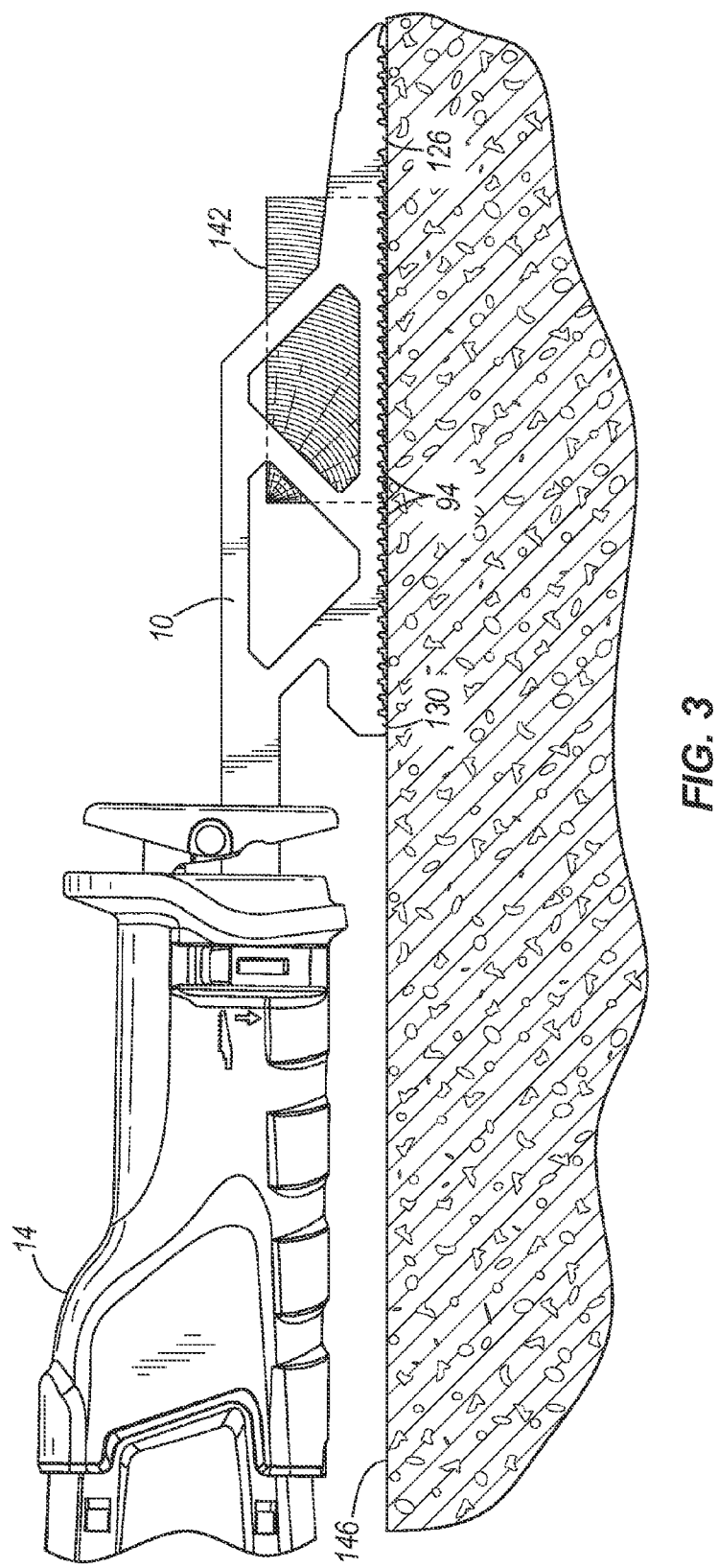
FIG. 3 illustrates the saw blade of FIG. 1 connected to a reciprocating saw and performing a footer cut.
Figure 4:
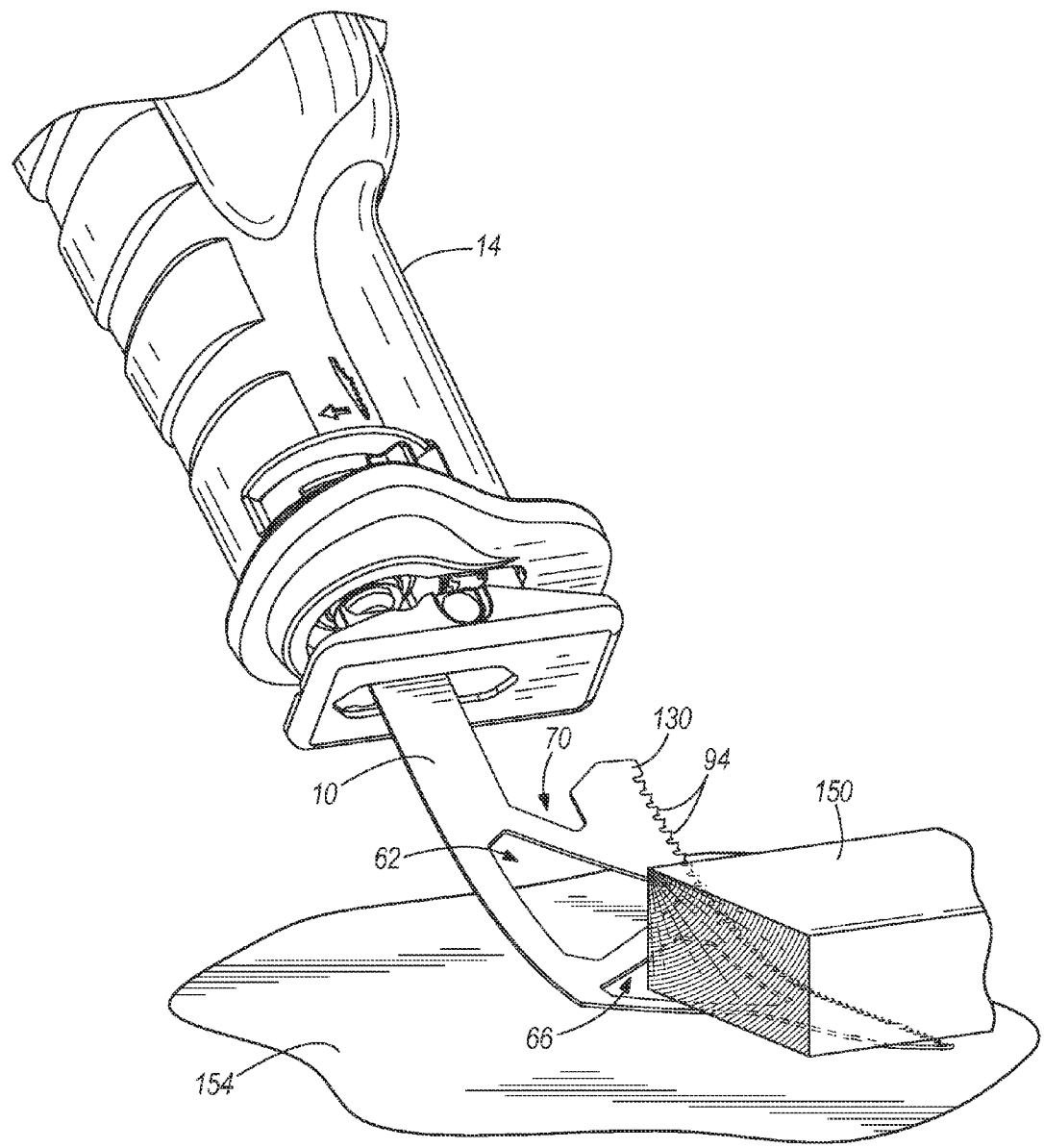
FIG. 4 illustrates the saw blade of FIG. 1 connected to the reciprocating saw and performing a flush cut.

FIG. 1 illustrates a saw blade 10 according to one embodiment of the invention. The illustrated saw blade 10 is a reciprocating saw blade for use with a power tool such as, for example, a reciprocating saw 14 (FIGS. 3 and 4). The saw blade 10 includes a body 18, an attachment portion 22 for connecting the blade 10 to the reciprocating saw 14, and a cutting portion 26 defining a plane 30. In the illustrated embodiment, the body 18, the attachment portion 22, and the cutting portion 26 are integrally formed as a single piece such that the saw blade 10 is a unitary structure. In other embodiments, the saw blade 10 may be formed from several pieces that are welded or otherwise secured together.

The body 18 includes a nose portion 34, an extension portion 38, and a main body portion 42. The body 18 also includes a back edge 46 extending between the extension portion 38 and the main body portion 42. The nose portion 34 is relatively narrow (i.e., short) compared to the main body portion 42 and extends from the main body portion 42. A leading edge 50 of the main body portion 42 is oriented at an angle $A_1$ relative to the back edge 46 to transition to the nose portion 34. The leading edge 50 offsets the nose portion 34 from the back edge 46. In the illustrated embodiment, the angle $A_1$ of the leading edge 50 relative to the back edge 46 is approximately 45 degrees. In other embodiments, the angle $A_1$ may be larger or smaller.

The extension portion 38 is also relatively narrow compared to the main body portion 42 and supports the attachment portion 22. The extension portion 38 extends from the main body portion 42 in a direction opposite the nose portion 34 such that the attachment portion 22 defines a first end 54 of the body 18 and the nose portion 34 defines a second end 58 of the body 18. The back edge 46 is generally continuous and planar between the extension portion 38 and the main body portion 42.

The main body portion 42 is taller than the nose portion 34 and the extension portion 38 and defines three openings 62, 66, 70. The first and second openings 62, 66 are generally the same shape and size, but are inverted relative to one another. In the illustrated embodiment, the first and second openings 62, 66 are generally triangular-shaped such that the main body portion 42 resembles a truss. A web 74 of the main body portion 42 extends between the first opening 62 and the second opening 66 to separate the openings 62, 66. The first and second openings 62, 66 are thereby completely bounded by the body 18. The third opening 70 is formed as a cutout in a trailing edge 78 of the main body portion 42. The trailing edge 78 also defines a third end 82 of the body 18. The openings 62, 66, 70 remove material from the body 18 to facilitate flexing the body 18 while performing a flush cut (FIG. 4) with the saw blade 10.

The illustrated body 18 of the saw blade 10 has an overall length $L_1$ and an overall height $H_1$. The overall length $L_1$ is measured generally parallel to the plane 30 from the first end 54 of the body 18 to the second end 58 of the body 18. The overall height $H_1$ is measured generally perpendicularly from the back edge 46 of the body 18 to the plane 30. In some embodiments, the overall length $L_1$ is between approximately 8 inches and approximately 12 inches, and the overall height $H_1$ is between approximately 2 inches an approximately 2.5 inches. In such embodiments, a ratio of the overall height $H_1$ to the overall length $L_1$ is between approximately 0.17 and approximately 0.31. The relatively large overall height $H_1$ of the body 18 helps guide the saw blade 10 along a surface while performing a flush cut (FIG. 4). In the illustrated embodiment, the overall length $L_1$ is approximately 12 inches and the overall height $H_1$ is approximately 2.1 inches such that the ratio of the overall height $H_1$ to the overall length $L_1$ is approximately 0.18.

The overall height $H_1$ of the saw blade 10 is maintained through approximately 60 percent of the overall length $L_1$ of the blade 10. In the illustrated embodiment, a distance $L_2$ from the first end 54 of the body 18 to the point where the body 18 begins to transition to the nose portion 34 (i.e., the start of the leading edge 50) is approximately 7.625 inches. At the nose portion 34, the height of the saw blade 10 is reduced to that of a conventional reciprocating saw blade. In other embodiments, the distance $L_2$ from the first end 54 of the body 18 to the leading edge 50 may be relatively longer or shorter.

The illustrated extension portion 38 has a height $H_2$ measured generally perpendicular to the back edge 46 of the body 18. The height $H_2$ of the extension portion 38 is significantly less than the overall height $H_1$ of the saw blade 10. In some embodiments, a ratio of the overall height $H_1$ to the extension portion height $H_2$ is between approximately 2.7 and approximately 3.3. In the illustrated embodiment, the extension portion height $H_2$ is approximately 0.75 inches and the ratio is approximately 2.8. In other embodiments, the extension portion height $H_2$ may be relatively larger or smaller.

The attachment portion 22 extends from the body 18 and includes a tang 86 and an aperture 90. The tang 86 and the aperture 90 are configured to engage a blade clamp of a reciprocating saw to securely and releasably connect the blade 10 to the saw. In the illustrated embodiment, the attachment portion 22 extends from the body 18 at a zero degree tang angle (i.e., the attachment portion 22 extends generally parallel to the plane 30). In other embodiments, the attachment portion 22 may extend from the body 18 at an oblique angle such that the saw blade 10 reciprocates at an angle relative to a reciprocating saw.

The attachment portion 22 has a height $H_3$ measured generally perpendicular to the plane 30. Similar to the extension portion 38, the height $H_3$ of the attachment portion 22 is significantly less than the overall height $H_1$ of the body 18. In some embodiments, a ratio of the overall height $H_1$ to the attachment portion height $H_3$ is between approximately 4 and approximately 5. In the illustrated embodiment, the height $H_3$ of the attachment portion 22 is approximately 0.5 inches and the ratio of the overall height $H_1$ to the attachment portion height $H_3$ is approximately 4.2. In other embodiments, the attachment portion height $H_3$ may be relatively larger or smaller.

The attachment portion 22 is offset from the plane 30 and from the third end 82 of the body 18 to facilitate performing a footer cut (FIG. 3) with the saw blade 10. In particular, the attachment portion 22 is spaced a first offset distance $H_4$, measured generally perpendicular to the plane 30, from the plane 30. The attachment portion 22 is also spaced a second offset distance $L_3$, measured generally parallel to the plane 30, from the third end 82 of the body 18. The first and second offset distances $H_4$, $L_3$ provide clearance between the attachment portion 22 and the cutting portion 26 to reduce interference from a connected reciprocating saw while performing cuts in constricted areas. In some embodiments, a ratio of the first offset distance $H_4$ to the overall height $H_1$ of the saw blade 10 is between approximately 0.6 and approximately 0.8, and a ratio of the second offset distance $L_3$ to the overall length $L_1$ of the saw blade 10 is between approximately 0.2 and approximately 0.4. In the illustrated embodiment, the first offset distance $H_4$ is approximately 1.5 inches and the second offset distance $L_3$ is approximately 2.8 inches. In other embodiments, the first and second offset $H_4$, $L_3$ distances may be larger or smaller.

Figure 2:
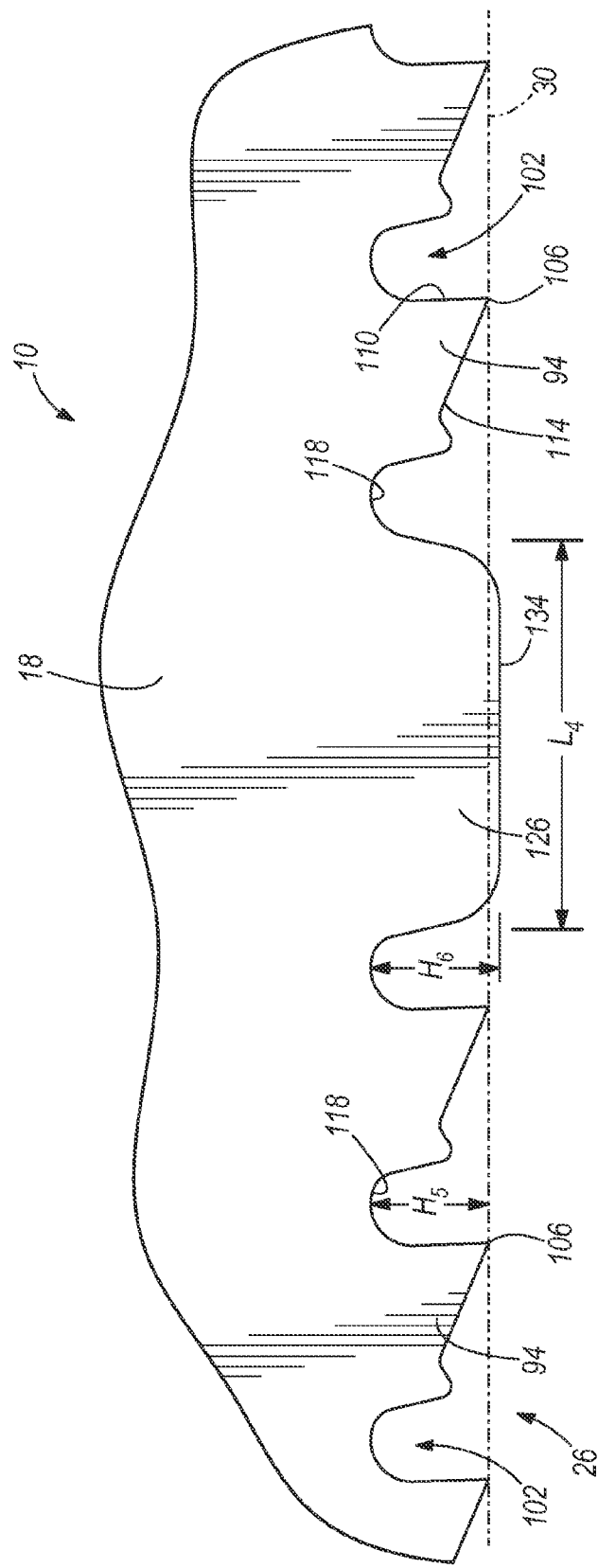
FIG. 2 is an enlarged view of a portion of the saw blade shown in FIG. 1.

The cutting portion 26 extends from the second end 58 of the body 18 to the third end 82 of the body 18. The cutting portion 26 includes a plurality of cutting teeth 94 and a tip portion 98. The cutting teeth 94 are generally similarly shaped and sized to define a tooth form along the body 18. The cutting teeth 94 are separated by a plurality of gullets 102. As shown in FIG. 2, each cutting tooth 94 includes a tip 106, a rake face 110, and a relief face 114. The tips 106 of the cutting teeth 94 define the plane 30 of the cutting portion 26. Each cutting tooth 94 has a height $H_5$ measured generally perpendicular to the plane 30 from a base 118 of a corresponding gullet 102 to the plane 30. In the illustrated embodiment, the height $H_5$ of each tooth 94 is approximately 0.1 inches. In other embodiments, the height $H_5$ of the teeth 94 may be relatively larger or smaller or may vary along the cutting portion 26.

Referring back to FIG. 1, the tip portion 98 is formed on the nose portion 34 of the body 18 at the second end 58. The illustrated tip portion 98 is a plunge point including an enlarged first gullet 122 for initiating a plunge cut with the saw blade 10. In other embodiments, the cutting portion 26 may include different tip configurations for initiating a plunge cut. In still other embodiments, the tip portion 98 may simply define an end of the tooth form and may not be specifically configured for performing a plunge cut.

The illustrated cutting portion 26 also includes two floor guard teeth 126, 130 extending from the body 18. In other embodiments, the cutting portion 26 may include fewer or more floor guard teeth, or the floor guard teeth may be omitted. The first floor guard tooth 126 is positioned toward the second end 58 of the body 18 between two cutting teeth 94. The illustrated first floor guard tooth 126 is spaced apart from the second end 58 such that the first floor guard tooth 126 does not interfere with plunge cuts. The second floor guard tooth 130 is positioned at the third end 82 of the body 18 adjacent a single cutting tooth 94. The first and second floor guard teeth 126, 130 are spaced apart from each other to minimize interference when cutting through a board. The first floor guard tooth 126 is positioned far enough away from the second floor guard tooth 130 such that the teeth 126, 130 remain on opposite sides of and do not contact the board as the saw blade 10 is reciprocated. For example, in some embodiments, the floor guard teeth 126, 130 may be spaced at least 6.5 inches apart from each other to cut through a 2×6 board. In the illustrated embodiment, the first floor guard tooth 126 is spaced approximately 7.25 inches apart from the second floor guard tooth 130. In other embodiments, the floor guard teeth 126, 130 may be spaced closer to or further from each other to cut through 2×4, 2×8, or 2×10 boards.

The illustrated floor guard teeth 126, 130 are spaced apart from the cutting teeth 94 by one of the gullets 102. In other embodiments, the floor guard teeth 126, 130 may be spaced further apart from the cutting teeth 94 such that a larger gullet or dead space is present between the floor guard teeth 126, 130 and the cutting teeth 94. Each floor guard tooth 126, 130 is generally rounded and includes a relatively flat contact surface 134, 138. The contact surfaces 134, 138 are generally parallel to the plane 30. The contact surfaces 134, 138 of the floor guard teeth 126, 130 contact a floor or other surface while performing a footer cut (FIG. 3) with the saw blade 10 to inhibit the cutting teeth 94 from contacting the floor surface.

Each floor guard tooth 126, 130 is generally longer than each cutting tooth 94. In the illustrated embodiment, the floor guard teeth 126, 130 are at least twice as long as each cutting tooth 94. In particular, a length $L_4$ of the illustrated first floor guard tooth 126 (FIG. 2) is approximately equal to the length of two adjacent cutting teeth 94, including the gullet 102 positioned therebetween. A length of the illustrated second floor guard tooth 130 is approximately equal to the length of two adjacent cutting teeth 94, but without a gullet positioned therebetween. In other embodiments, the floor guard teeth 126, 130 may be relatively longer or shorter.

As shown in FIG. 2, the floor guard teeth 126, 130 are also generally taller than the cutting teeth 94 such that the floor guard teeth 126, 130 extend from the body 18 beyond the plane 30. The first floor guard tooth has a height $H_6$ measured generally perpendicular to the plane 30 from the base 118 of a corresponding gullet 102 to the contact surface 134. In some embodiments, a ratio of the floor guard tooth height $H_6$ to the cutting tooth height $H_5$ is approximately 1.1. In the illustrated embodiment, the floor guard tooth height $H_6$ is approximately 0.11 inches such that the first floor guard tooth 126 extends approximately 0.01 inches beyond the plane 30. Although only the first floor guard tooth 126 is shown in FIG. 2, the second floor guard tooth 130 has approximately the same height as the first floor guard tooth 126 and extends beyond the plane 30 approximately the same distance. In other embodiments, the first and second floor guard teeth 126, 130 may have different heights.

In some embodiments, the cutting teeth 94 are set relative to the body 18 of the saw blade 10. In the illustrated embodiment, the cutting teeth 94 between the second end 58 of the body 18 and the first floor guard tooth 126 are unset. Leaving these teeth 94 unset facilitates making straight and smooth cuts with the saw blade 10 along the side of, for example, a window framing board. The unset teeth 94 allow the nose portion 32 of the saw blade 10 to lay flush against a framing board to minimize damage to the board while cutting. At least some of the cutting teeth 94 between the first and second floor guard teeth 126, 130 are set. For example, the cutting teeth 94 between the floor guard teeth 126, 130 may be arranged such that one tooth is set in a first direction, the first subsequent tooth is set in a second direction, the second subsequent tooth is set in the first direction, the third subsequent tooth is set in the second direction, and the fourth subsequent tooth is unset. This pattern is repeated along the cutting portion 26. In the illustrated embodiment, all of the cutting teeth 94 immediately adjacent the first and second floor guard teeth 126, 130 are unset. In other embodiments, the cutting teeth 94 may be set in other patterns along the tooth form.

FIG. 3 illustrates the saw blade 10 performing a footer cut. During a footer cut, the saw blade 10 is used to cut a board 142, or other piece of material, that is directly adjacent a floor surface 146. The attachment portion 22 is inserted into the reciprocating saw 14 to connect the saw blade 10 to the saw 14. Since the attachment portion 22 is offset vertically and horizontally from the cutting portion 26 as described above, the reciprocating saw 14 is likewise offset from the cutting portion 26. The offset reduces, or even eliminates, interference of the reciprocating saw 14 with the floor surface 146 as the saw blade 10 cuts through the board 142.

In addition, as the saw blade 10 completes the cut through the board 142, the cutting teeth 94 would normally contact the floor surface 146 (which may be made of, for example, concrete), possibly breaking, dulling, or otherwise damaging the teeth 94. Since the floor guard teeth 126, 130 extend further from the body 18 than the cutting teeth 94, the floor guard teeth 126, 130 contact the floor surface 146 and inhibit the cutting teeth 94 from contacting the floor surface 146. The floor guard teeth 126, 130 also help protect relatively softer surfaces (e.g., wood floors) by inhibiting the cutting teeth 94 from contacting and cutting into the soft surfaces. Providing at least two spaced apart floor guard teeth 126, 130 creates two points of contact between the saw blade 10 and the floor surface 146 to reduce the possibility of the saw blade 10 tilting relative to the floor surface 146 while performing the cut. In addition, providing the attachment portion 22 at the zero degree tang angle makes the saw blade 10 come down generally perpendicular to the floor surface 146 such that both floor guard teeth 126, 130 contact the surface 146 at the same time.

FIG. 4 illustrates the saw blade 10 performing a flush cut. During a flush cut, the saw blade 10 is used to cut a board or work piece 150 that is directly adjacent a relatively flat surface, such as a floor surface 154. Such cuts are typically difficult to perform so close to the floor surface 154 because the relatively wide reciprocating saw 14 contacts the floor surface 154 and prevents a conventional saw blade from cutting directly against the surface 154. The openings 62, 66, 70 of the illustrated saw blade 10 facilitate performing the flush cut by reducing the stiffness of the saw blade 10 along its length. In particular, the openings 62, 66, 70 facilitate flexing or bending of the body 18 of the saw blade 10. In addition, the relatively large overall height $H_1$ of the saw blade 10 increases tracking of the blade 10 along the floor surface 154 to facilitate cutting in a straight line. The large overall height $H_1$ also reduces the possibility of the saw blade 10 "walking" into and damaging a framing board when performing a flush cut along the framing board.

Figure 5:
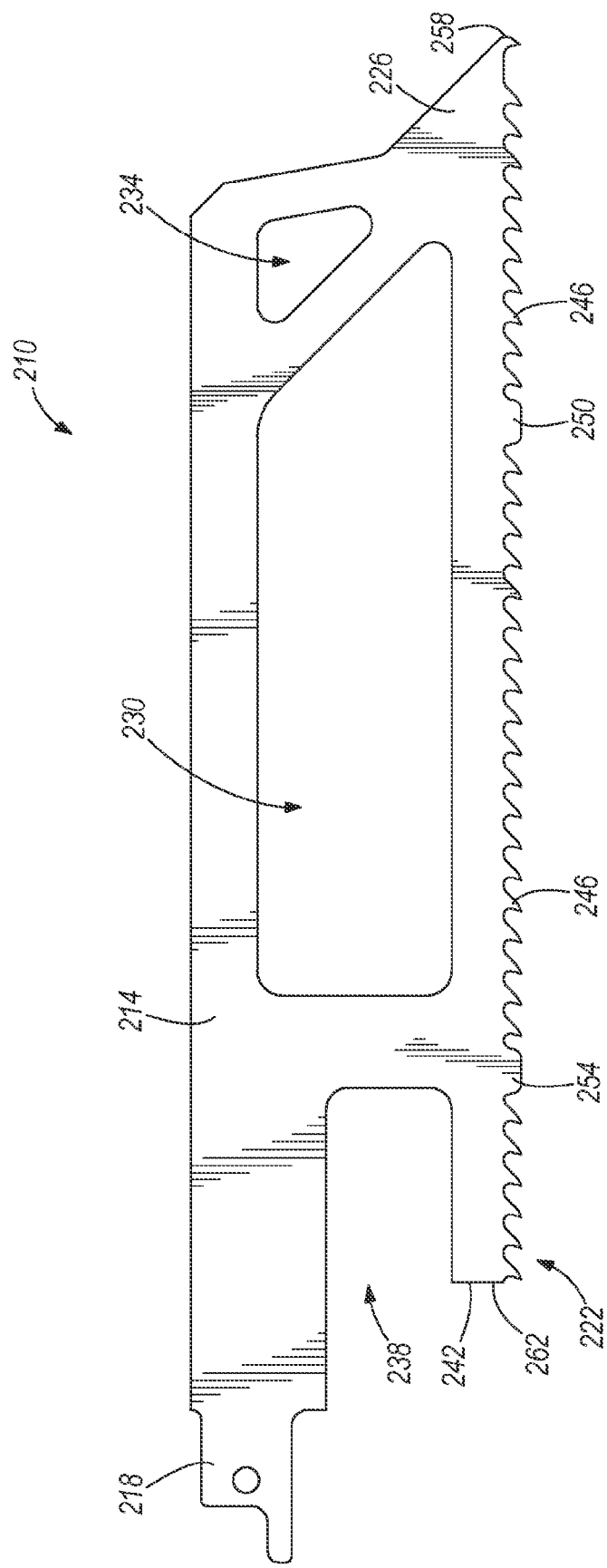
FIG. 5 illustrates a saw blade according to another embodiment of the invention.

FIG. 5 illustrates a saw blade 210 according to another embodiment of the invention. The illustrated saw blade 210 is similar to the saw blade 10 discussed above. Differences between the saw blades 10, 210 are discussed in detail below.

The saw blade 210 is a reciprocating saw blade and includes a body 214, an attachment portion 218, and a cutting portion 222. The body 214 includes a relatively short nose portion 226 compared to the nose portion 34 of the saw blade 10 shown in FIG. 1. The overall height of the illustrated saw blade 210 is thereby maintained through a larger percentage of its overall length.

The body 214 also defines three openings 230, 234, 238 to increase the flexibility of the saw blade 210. In the illustrated embodiment, the first opening 230 is considerably larger than the second opening 234. In addition, the first opening 230 is bounded on four sides such that the first opening 230 is a quadrilateral, while the second opening 234 is bounded on three sides such that the second opening 234 is a triangle. Similar to the third opening 70 discussed above, the illustrated third opening 238 is formed as a cutout in a trailing edge 242 of the body.

The cutting portion 222 includes a plurality of cutting teeth 246 and two floor guard teeth 250, 254. In the illustrated embodiment, the first floor guard tooth 250 is spaced from a second end 258 of the body 214 and positioned between two cutting teeth 246. The second floor guard tooth 254 is spaced from a third end 262 of the body 214 and also positioned between two cutting teeth 246. The floor guard teeth 250, 254 extend from the body 214 further than the cutting teeth 246 to inhibit the cutting teeth 246 from contacting a floor surface while performing a footer cut.

Although the invention has been described in detail with reference to certain preferred embodiments, variations and modifications exist within the scope and spirit of one or more independent aspects of the invention. Various features and advantages of the invention are set forth in the following claims.

What is claimed is:

1. A saw blade for use with a reciprocating saw, the saw blade comprising:

a body including a nose portion, an extension portion, and a main body portion, the nose portion being shorter than the main body portion and extending from the main body portion to define a second end of the body, the extension portion being shorter than the main body portion and extending from the main body portion in a direction opposite the nose portion to define a first end of the body, the body having a linear back edge extending between the extension portion and the main body portion, the main body portion having a leading edge extending from the linear back edge to transition to the nose portion, the leading edge being angled relative to the linear back edge to offset the nose portion from the linear back edge, the main body portion also defining an opening that is completely bounded by the body to facilitate flexing the body while performing a flush cut with the saw blade;

an attachment portion supported by the extension portion at the first end of the body, the attachment portion including a tang and an aperture configured to connect to the reciprocating saw; and a cutting portion formed on the body opposite the linear back edge, the cutting portion including a plurality of cutting teeth and a floor guard tooth positioned adjacent at least one of the plurality of cutting teeth, each cutting tooth having a tip that defines a plane, the floor guard tooth including a non-cutting portion that extends 0.01 inches beyond the plane;

a tip portion having a first part including a linear edge extending from the leading edge and angled relative to the leading edge to offset the tip portion from the nose portion and a second part defined by the cutting portion of the body opposite the linear back edge and the leading edge, wherein a first gullet is adjacent the second end of the body and a first group of cutting teeth of the plurality of cutting teeth are positioned on the nose portion and the second part of the tip portion between the floor guard tooth on the nose portion and the second end of the body;

wherein the attachment portion is offset from the plane to reduce interference of the reciprocating saw with a surface while performing a footer cut with the saw blade, and wherein the floor guard tooth contacts the surface while performing the footer cut to inhibit the plurality of cutting teeth from contacting the surface.

2. The saw blade of claim 1, wherein the floor guard tooth is a first floor guard tooth, wherein the cutting portion includes a second floor guard tooth spaced apart from the first floor guard tooth and positioned adjacent at least one of the plurality of cutting teeth, and wherein the second floor guard tooth includes a non-cutting portion that extends 0.01 inches beyond the plane.

3. The saw blade of claim 2, wherein the first floor guard tooth is spaced at least 6.5 inches from the second floor guard tooth.

4. The saw blade of claim 3, wherein the first floor guard tooth is spaced 7.25 inches from the second floor guard tooth.

5. The saw blade of claim 2, wherein the first floor guard tooth is positioned between two cutting teeth, and wherein the second floor guard tooth is positioned at an end of the cutting portion adjacent a single cutting tooth.

6. The saw blade of claim 1, wherein the non-cutting portion of the floor guard tooth includes a relatively flat surface that is parallel to the plane and a rounded corner at each end of the relatively flat surface.

7. The saw blade of claim 6, wherein the relatively flat surface is at least twice as long as each cutting tooth.

8. The saw blade of claim 1, wherein the body has a first height measured perpendicularly from the back edge to the plane, wherein the attachment portion has a second height measured perpendicular to the plane, and wherein a ratio of the first height to the second height is between 4 and 5.

9. The saw blade of claim 8, wherein a ratio of a height of the extension portion to the first height is between 2.8 and 3.3.

10. The saw blade of claim 1, wherein the attachment portion is offset 1.5 inches from the plane in a direction perpendicular to the plane.

11. The saw blade of claim 1, wherein all of the first group of cutting teeth are unset.

12. The saw blade of claim 11, wherein the floor guard tooth is positioned between the first group of cutting teeth and a second group of cutting teeth, and wherein at least some of the second group of cutting teeth are set.

13. The saw blade of claim 1, wherein the cutting portion incudes a plurality of gullets separating the plurality of cutting teeth, and wherein the floor guard tooth is spaced from the at least one of the plurality of cutting teeth by at least one of the plurality of gullets.

14. The saw blade of claim 13, wherein a gullet adjacent the one of the plurality of cutting teeth defining the second end of the body is larger than each of the plurality of gullets.

\* \* \* \* \*